United States Patent [19]

Nakamura et al.

[11] 4,191,021
[45] Mar. 4, 1980

[54] SMALL POWER PLANT UTILIZING WASTE HEAT

[75] Inventors: Shozo Nakamura, Hitachiota; Michio Kuroda; Ryoichiro Oshima, both of Hitachi, all of Japan

[73] Assignee: Hitachi, Ltd., Japan

[21] Appl. No.: 816,171

[22] Filed: Jul. 15, 1977

[30] Foreign Application Priority Data

Aug. 11, 1976 [JP] Japan .................................. 51-94806

[51] Int. Cl.$^2$ ............................................. F01K 25/10
[52] U.S. Cl. ........................................ 60/657; 60/649; 60/673; 60/646; 60/671
[58] Field of Search ................. 60/649, 646, 657, 673; 122/31; 184/6; 277/15

[56] References Cited

U.S. PATENT DOCUMENTS

| 2,222,575 | 11/1940 | Schutte | 122/31 R |
|---|---|---|---|
| 4,005,580 | 2/1977 | Swearingen | 60/657 |
| 4,043,386 | 8/1977 | Franz et al. | 60/641 |
| 4,084,379 | 4/1978 | Schwartzman | 60/649 X |

OTHER PUBLICATIONS

"The Organic Rankine Cycle" by Gerald S. Leighton, U.S. Atomic Energy Commission, IECEC, 1968, pp. 389-397.
"Prospectives for Waste Heat Recovery by Means of Organic Fluid Cycles," by Angelino and Moroni, Journal of Engineering for Power, Apr. 1973.

*Primary Examiner*—Allen M. Ostrager
*Attorney, Agent, or Firm*—Craig and Antonelli

[57] ABSTRACT

A small power plant utilizing waste heat wherein:

an intermediate heat transfer medium being thermally stable and capable of lubricating bearings is interposed between a heat source and a turbine operating medium;

heat of said intermediate heat transfer medium is taken off through a direct contact heat exchanger to change said turbine operating medium in phase from a liquid state to a gaseous state; and a portion of said intermediate heat transfer medium is supplied as the lubricant for the bearings of the turbine and generator.

4 Claims, 3 Drawing Figures

SMALL POWER PLANT UTILIZING WASTE HEAT

BACKGROUND OF THE INVENTION

This invention relates to a small power plant utilizing waste heat, and particularly concerned with said power plant characterized by having an intermediate heat transfer medium between a heat source and a turbine operating medium so as to heat said turbine operating medium through direct contact.

In general, freon turbine power plants are being used as the small power plants utilizing waste heat. With said freon turbine power plant, freon has the upper working temperature limit as viewed from heat stability and corrosion of freon, and the temperature of freon at the outlet of boiler must be controlled to less than said upper working temperature.

However, in said freon boiler, the temperatures of the heating medium and side heating medium such as a gas and a steam can not be elevated to too much higher temperature than the upper working temperature limit of freon in order to prevent degradation of freon by heat (at about 170° C.) which is being in contact with heat conductive pipes of boiler. The reason is that degradation of freon by heat results in generation of chlorine which is highly corrosive. For this reason, the difference in temperature between freon gas at the outlet of boiler and the heating medium can not be made too large. Accordingly, the use of a freon boiler entails an increase in the size as compared with the output. Further, freon has such a property that it has a strong affinity for oil, and hence freon melts oils such as a turbine oil for bearings of freon turbine with the resultant decrease in the capacity of said oil in lubricating the bearings.

BRIEF SUMMARY OF THE INVENTION

The present invention contemplates to provide a small power plant utilizing waste heat characterized in that a special intermediate heat transfer medium is interposed between a heat source and a turbine operating medium and the heat of said intermediate heat transfer medium is taken off through a direct contact heat exchanger to change said turbine operating medium in phase from a liquid state to a gaseous state, obviate the aforesaid disadvantages in a freon turbine, and to provide a more compact, small power plant.

Namely, one object of the present invention is to provide a small power plant utilizing waste heat wherein the difference in temperature of a heating medium from an intermediate heat transfer medium can be made large by use of an intermediate heat transfer medium being thermally stable and capable of lubricating bearings and said intermediate heat transfer medium is adapted to be supplied as the lubricant for the bearings of the turbine and generator.

Another object of the present invention is to provide a small power plant utilizing waste heat wherein the difference in temperature of a heating medium from an intermediate heat transfer medium can be made large by use of an intermediate heat transfer medium being thermally stable, and a heat exchanger is reduced in size by subjecting said intermediate heat transfer medium to direct contact heat exchange with a turbine operating medium for taking heat off said intermediate heat transfer medium with the resultant change of said turbine operating medium in phase from a liquid state to a gaseous state.

A further object of the present invention is to provide a small power plant utilizing waste heat wherein a turbine operating medium is preheated by use of a condensate of the turbine operating medium for cooling an intermediate heat transfer medium used in lubricating bearings.

BRIEF DESCRIPTION OF THE DRAWINGS

Description will hereunder be given of the arrangement of the present invention with reference to an embodiment shown in drawings.

DETAILED DESCRIPTION OF THE PREFERRED EMBODIMENT

Figure 1:
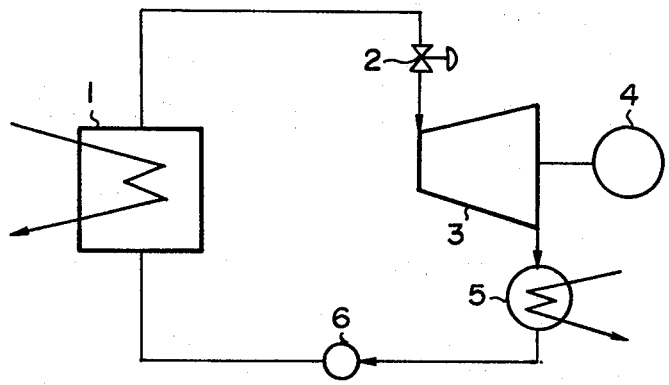
FIG. 1 is a diagramatic illustration of a conventional freon turbine power plant.

First of all, description will be given of the outline of the conventional freon turbine power plant with reference to FIG. 1. Freon gas produced in a freon boiler 1 flows into a freon turbine 3 through a control valve 2, drives a turbine to generate electricity by use of a generator 4, and thereafter enters a freon condenser 5 where freon gas is changed into freon liquid. Said freon liquid is caused to circulate to the freon boiler 1 by a freon pump 6.

Figure 2:
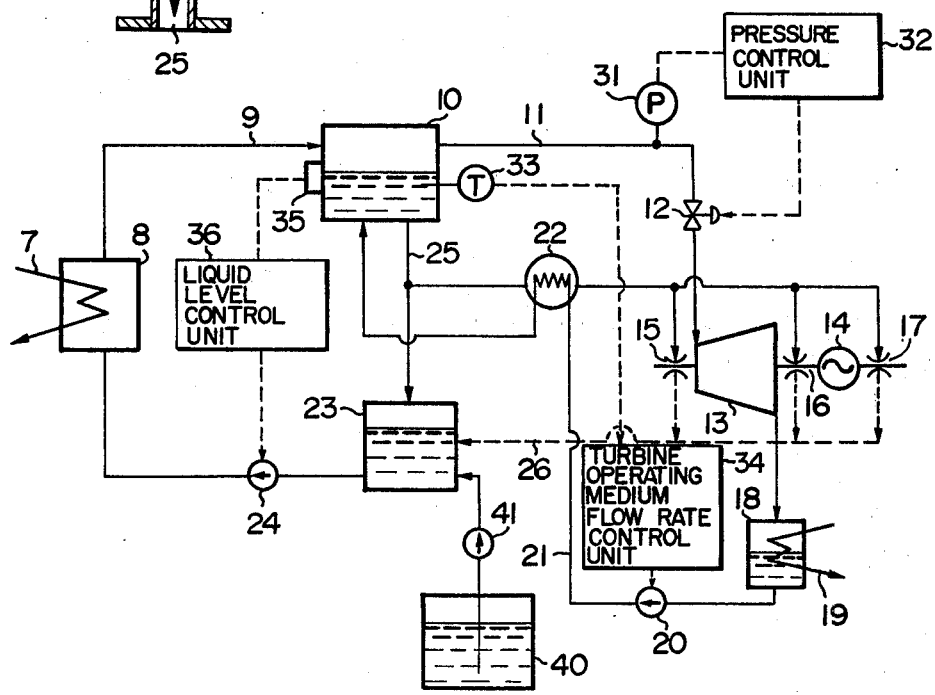
FIG. 2 is a diagramatic illustration of the power plant according to the present invention.

In contrast to this, with an arrangement according to the present invention shown in FIG. 2, an intermediate heat transfer medium is heated by a heating medium of a heat source through a heat exchanger, said intermediate heat transfer medium is subjected to direct contact heat exchange with a turbine operating medium to thereby generate a gaseous turbine operating medium, and the gaseous turbine operating medium is separated from the intermediate heat transfer medium. Said separate gas of turbine operating medium is introduced to the turbine to thereby generate electricity.

Namely, the intermediate heat transfer medium 9 is sent from an intermediate heat transfer medium tank 23 to an intermediate heat transfer medium heater 8 by an intermediate heat transfer medium pump 24, and said intermediate heat transfer medium 9 is heated by a heating medium 7. The heated intermediate heat transfer medium 9 enters a direct contact heat exchanger 10 where a liquefied turbine operating medium 21 is heated by direct contact of the liquefied turbine operating medium 21 sent thereinto by the turbine operating medium pump 20 with the heated intermediate heat transfer medium 9, thereby producing a gaseous turbine operating medium. Additionally, said direct contact heat exchanger 10 has a function of separating the gaseous turbine operating medium 11 from the intermediate heat transfer medium 25. The gaseous turbine operating medium 11 which has been produced in the direct contact heat exchanger 10 flows into a turbine 13 through a control valve 12. By this, electricity has been generated by a generator 14, thereafter, the gaseous turbine operating medium 11 is exhausted from the turbine 13, enters a turbine operating medium condenser 18 where the gaseous turbine operating medium is deprived of its latent heat by a condenser cooling medium 19 to thereby become a liquefied turbine operating medium 21.

Said liquefied turbine operating medium 21 is sent to an intermediate heat transfer medium cooler 22 by the turbine operating medium pump 20, takes heat off a intermediate heat transfer medium 25 which comes from the direct contact heat exchanger 10, and is sent to said direct control heat exchanger 10.

On the other hand, part of the intermediate heat transfer medium 25 from the direct contact heat exchanger 10 is cooled by the liquefied turbine operating medium 21 in the intermediate heat transfer medium cooler 22, and enters the bearings 15, 16, 17 of the turbine and generator 14 as the lubricant. The drain 26 of intermediate heat transfer medium which has taken heat off the bearings enters the intermediate heat transfer medium tank 23.

Additionally, the remaining intermediate heat transfer medium 25 directly enters the intermediate transfer medium tank.

The range of waste heat temperature which is most suitably applicable is about from 200° to 300° C. Gas, warm water and steam may be suitable for the heating mediums. Lubricating oils, refined hindered ester oils, Tris-(Nonyl-Phenyl)-Phosphiate oils and the like that are thermally stable and capable of lubricating can be listed as the intermediate heat transfer mediums. Additionally, freon refrigerant, organic mediums including methane and ammonia, low boiling point mediums including isobuthane, propane, Dowtherm A and Fluorinal-85 and the like can be listed as the examples of turbine operating mediums.

The following advantages can be attained when, as described above, the intermediate heat transfer medium being thermally stable and capable of lubricating is interposed between the heating medium of heat source and the turbine operating medium, the gaseous turbine operating medium is produced by direct contact between said intermediate heat transfer medium and the turbine operating medium, and the direct contact heat exchanger is provided which can separate the gaseous turbine operating medium from the intermediate heat transfer medium.

Namely, the use of the intermediate heat transfer medium being thermally stable enables to increase the difference in temperature between the intermediate heat transfer medium and the heating medium in the intermediate heat transfer medium heater so that the intermediate heat transfer medium heater can be reduced in size and also the direct contact heat exchanger can be reduced in size because direct contact heat exchange is effected between the intermediate heat transfer medium and the turbine operating medium. Additionally, said intermediate heat transfer medium can be used as the lubricant for the bearings of the turbine and generator so that decrease in the capacity of lubrication can be prevented. In addition to the above, the condensate of turbine operating medium can be used for cooling the intermediate heat transfer medium used for the lubrication of the bearings, and the turbine operating medium can be preheated so that the production of gaseous turbine operating medium is facilitated in the direct contact heat exchanger and the direct contact heat exchanger can be reduced in size.

Figure 3:
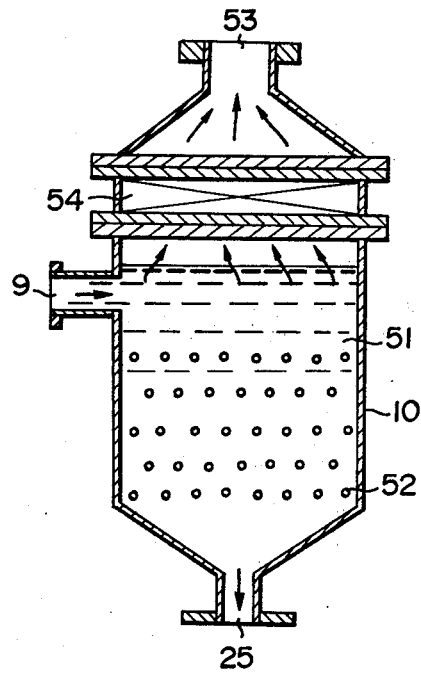
FIG. 3 is a longitudinal cross-sectional view of the direct contact heat exchanger.

Further, detailed description will hereunder be given of the direct contact heat exchanger 10 with reference to FIG. 3. The intermediate heat transfer medium which has been heated by the intermediate heat transfer medium heater 8 shown in FIG. 2 enters the intermediate heat transfer medium tank 51 through the intermediate heat transfer medium inlet 9 shown in FIG. 3, where it gives heat to the turbine operating medium which has been blown out from the turbine operating medium nozzle 52, and upon vaporizing the turbine operating medium, flows out of the intermediate heat transfer medium outlet 25. On the other hand, the gaseous turbine operating medium which has been vaporized in the intermediate heat transfer medium tank 51 passes through a demister 54, and, upon the removal of liquid droplets included therein, flows out of the gaseous turbine operating medium outlet 53.

Next, description will be given of the control unit shown in FIG. 2.

Namely, the pressure of the gaseous turbine operating medium 11 is detected by a pressure detector 31 and the signal is put into a pressure control unit 32. In said pressure control unit 32, the opening area of the control valve 12 is controlled based on the pressure difference between a predetermined value of pressure and the pressure detected by the pressure detector 31 so that the pressure of gaseous turbine operating medium can be made equal to the predetermined value of pressure.

Additionally, the temperature of the intermediate heat transfer medium in the direct contact heat exchanger 10 is detected by a temperature detector 33, and the signal is put into a turbine operating medium flow rate control unit 34. Said unit 34 emits a signal for controlling the number of revolutions of the turbine operating medium pump 20 in order to control the flow rate of the liquefied turbine operating medium 21 fed to the direct control heat exchanger 10 based on the deviation of said signal from the signal of predetermined temperature. Further, in the case of the presence of a flow rate control valve for controlling the flow rate of the liquefied turbine operating medium 21, not the number of revolutions of the turbine operating medium pump 20 but the opening area of said valve is controlled by the turbine operating medium flow rate control device 35.

Additionally, the liquid level of the direct contact heat exchanger 10 is detected by a liquid level detector 35, and the signal is put into a liquid level control unit 36. Said unit 36 emits a signal for controlling the number of revolutions of the intermediate heat transfer medium pump 24 in order to control the flow rate of the intermediate heat transfer medium 9 fed to the direct contact heat exchanger 10 based on the deviation of the signal from the signal of predetermined liquid level.

Further, the intermediate heat transfer medium is sent from the auxiliary intermediate heat transfer medium tank 40 to the intermediate heat transfer medium tank 23 by the intermediate heat transfer medium pump 41 in order to replenish the intermediate heat transfer medium when it runs short in the plant and to replace the intermediate heat transfer medium with new one when it is deteriorated.

What is claimed is:

1. A small power plant utilizing waste heat characterized in that
    said plant comprises: an intermediate heat transfer medium heater for transferring heat from a heat source to an intermediate heat transfer medium; a direct contact heat exchanger for transferring heat from said intermediate heat transfer medium to a turbine operating medium; and a turbine generating plant driven by said turbine operating medium;
    a material being capable of lubricating bearings, thermally stable and not chemically reactive with said turbine operating medium being used as said intermediate heat transfer medium; and a material taking heat off said intermediate heat transfer medium in said direct contact heat exchanger and being changeable in phase from a liquefied turbine operating medium to a gaseous turbine operating medium being used as said turbine operating medium, wherein at least a part of the intermediate heat transfer medium from said direct contact heat exchanger is supplied to said intermediate heat transfer medium heater through an intermediate heat transfer medium tank and wherein an intermediate heat transfer medium pump is interposed between said intermediate heat transfer medium heater and said tank, and said pump is controlled based on the liquid level of the intermediate heat transfer in said direct contact heat exchanger.

2. A small power plant utilizing water heat characterized in that said plant comprises:

an intermediate heat transfer medium heater for transferring heat from a heat source to an intermediate heat transfer medium;

a direct contact heat exchanger for transferring heat from said intermediate heat transfer medium to a turbine operating medium; and a turbine generating plant driven by said turbine operating medium;

a material being capable of lubricating bearings, thermally stable and not chemically reactive with said turbine operating medium being used as said intermediate heat transfer medium; and a material taking heat off said intermediate heat transfer medium in said direct contact heat exchanger and being changeable in phase from a liquefied turbine operating medium to a gaseous turbine operating medium being used as said turbine operating medium, and wherein part of said intermediate heat transfer medium at the outlet of said direct contact heat exchanger is supplied to the bearings of the turbine and generator.

3. A small power plant utilizing waste heat characterized in that said plant comprises:

an intermediate heat transfer medium heater for transferring heat from a heat source to an intermediate heat transfer medium;

a direct contact heat exchanger for transferring heat from said intermediate heat transfer medium to a turbine operating medium; and a turbine generating plant driven by said turbine operating medium;

a material being capable of lubricating bearings, thermally stable and not chemically reactive with said turbine operating medium being used as said intermediate heat transfer medium; and a material taking heat off said intermediate heat transfer medium in said direct contact heat exchanger and being changeable in phase from a liquefied turbine operating medium to a gaseous turbine operating medium being used as said turbine operating medium, and wherein the part of said intermediate heat transfer medium at the outlet of said direct contact heat exchanger is cooled by the liquefied turbine operating medium which is deprived of its latent heat and condensed in a turbine operating medium condenser and supplied to the bearings of the turbine and generator.

4. A small power plant utilizing waste heat as set forth in claim 3, characterized in that:

the liquefied turbine operating medium which has cooled said intermediate heat transfer medium is supplied to said direct contact heat exchanger.

* * * * *